(12) United States Patent
Konstantinovskiy

(10) Patent No.: US 7,988,088 B2
(45) Date of Patent: Aug. 2, 2011

(54) TUBULAR AIR TRANSPORT VEHICLE

(76) Inventor: Alexandr Konstantinovskiy, Kimry (RU)

( * ) Notice: Subject to any disclaimer, the term of this patent is extended or adjusted under 35 U.S.C. 154(b) by 388 days.

(21) Appl. No.: 12/134,004

(22) Filed: Jun. 5, 2008

(65) Prior Publication Data

US 2009/0302150 A1    Dec. 10, 2009

(51) Int. Cl.
  *B64C 39/06* (2006.01)
  *B64C 39/08* (2006.01)
  *B64C 39/10* (2006.01)
  *B64D 33/02* (2006.01)
  *B64F 1/10* (2006.01)

(52) U.S. Cl. .......... 244/12.6; 244/15; 244/36; 244/34 A; 244/45 R; 244/53 B; 244/63

(58) Field of Classification Search ................ 244/12.1, 244/12.2, 12.6, 13, 15, 23 R, 23 C, 29, 36, 244/45 R, 35 A, 34 A, 52, 53 B, 63, 73 R, 244/74, 76 J, 159.3, 171.2, 171.4, 171.6
See application file for complete search history.

(56) References Cited

U.S. PATENT DOCUMENTS

| | | | | |
|---|---|---|---|---|
| 2,252,342 A * | 8/1941 | Finley | | 244/73 R |
| 2,377,280 A * | 5/1945 | Stratton | | 244/103 S |
| 3,198,459 A * | 8/1965 | Geary | | 244/73 R |
| 3,212,734 A * | 10/1965 | Keenan | | 244/74 |
| 4,194,519 A * | 3/1980 | Baker et al. | | 244/53 B |
| 4,498,645 A * | 2/1985 | Hardy | | 244/12.6 |
| 4,833,879 A * | 5/1989 | Verduyn et al. | | 60/39.092 |
| 5,082,206 A * | 1/1992 | Kutschenreuter et al. | | 244/53 B |
| 5,913,493 A * | 6/1999 | Labouchere | | 244/105 |
| 6,682,017 B1 * | 1/2004 | Giannakopoulos | | 244/140 |
| 7,232,092 B2 * | 6/2007 | Yamamoto | | 244/63 |

OTHER PUBLICATIONS

The Caproni Stipa-1930s Flying Barrel Airplane, Fiddlersgreen.net website, Printed from the Internet on Aug. 16, 2008, 9 pages.

* cited by examiner

*Primary Examiner* — Tien Dinh
*Assistant Examiner* — Richard R Green
(74) *Attorney, Agent, or Firm* — Alexey Bakman, Esq.

(57) ABSTRACT

An air transport vehicle of the present invention comprises a tubular body, said body comprising an upper half and a lower half. The upper half is positioned above the lower half and connected thereto. A central bore is formed between the upper half and the lower half. The bore extends longitudinally from the nose end of the vehicle to the tail end of the vehicle. The vehicle also comprises at least one propulsion device, preferably positioned inside the bore. The vehicle further comprises at least one bulkhead. The bulkhead connects the upper half to the lower half, and extending longitudinally inside the bore, thus dividing the bore into parallel subsections. In preferred embodiments, the upper half and the lower half comprise cavities, used among other things, for cargo and passenger transport.

19 Claims, 10 Drawing Sheets

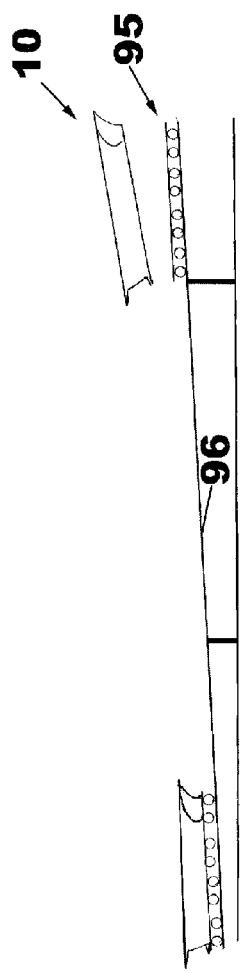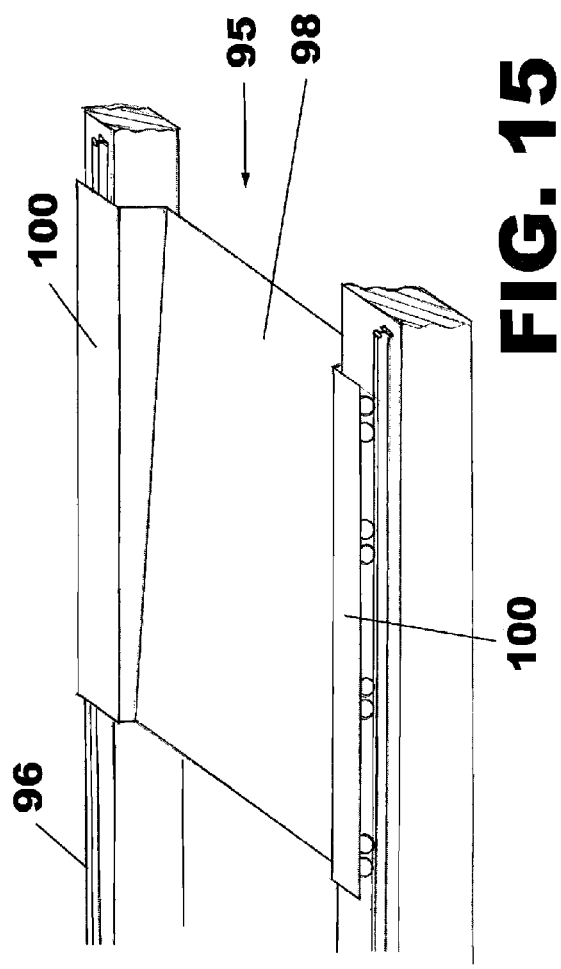

TUBULAR AIR TRANSPORT VEHICLE

FIELD OF THE INVENTION

The field of the present invention is air transport vehicles, and particularly a fundamentally new kind of an air transport vehicle, with tubular body.

BACKGROUND OF THE INVENTION

Since the first days of heavier-than air flight, the airplanes had one prominent universal characteristic—the wings. While winged flight has proved efficient as humanity's first step in understanding and recreating flight, the requirements of modern aviation are pushing the concept of winged flight to its limit, making the wing a limiting factor in advancement of powered flight.

The wings are constructively-complex and bulky elements, with numerous compromises inherent in any wing design. Wings are often the largest part of an airplane, and often the most important in determining storage and utilization costs. The wings limit the speed characteristics of an airplane. Wings have a strength threshold and are prone to tearing off at excessive speeds or load. The effects of turbulence and convective jets on the plane's fuselage are multiplied by the length of the wing, as through by a lever. These wing-magnified effects significantly contribute to wear of the aircraft and appearance of microscopic cracks on the fuselage, as well as on the wings themselves. This wear in turn significantly affects the safety of flight.

Wing has a number of aerodynamic deficiencies. For example, the form of the wing, accepted as optimal on today's airplanes is voluminous towards the front. While providing some advantages, this also creates disadvantages, such as increased resistance to the flow of oncoming air current. It also causes turbulence behind the wing, which in turn negatively effects flight characteristics and, overall, decreases fuel efficiency. The wing also has to be positioned at a considerable angle toward the oncoming air flow to provide a lifting stabilizing force, holding the plane suspended in mid-air. This also necessarily creates tremendous resistance on the wing, accelerating wear and lowering efficiency.

Swept wings of the modern aircraft allow for some reduction of drag at the cost of creating other problems. At high speeds, there is no time for airflow to react to redistribution, and air flow over the wing is virtually unaffected by the shape of the wing. At slower speeds, a problem of spanwise flow develops, where most of the air toward the tips of the wings moves along the wing, not over it, thus creating a dangerous reduction in lift. This in turn leads to unpredictable stalls, particularly dangerous at landing speeds, and known as "Sabre dance." Swept wings are also complex in production, show increased drag at slow speed, and apply significant torque to fuselage.

Necessary compromises in the length of the wing, greatly limit the operational height of the airplanes. At high altitudes, the wings provide insufficient lift, leading to unpredictable and fatal stalls. Yet it is at these high altitudes, that the airplane, particularly one with jet or rocket engines, will encounter the least drag, and can travel at highest speeds and with greatest efficiently. Limited lift of conventional wings also negatively affects maneuverability of the planes. Sharp turns, sometimes necessary to avoid collision or adjust heading at slow speeds often lead to unrecoverable stalls.

Wings are lightweight, flexible and fragile. Yet, there is no alternative on most of the planes of modern design, with narrow fuselage and wide wings, but to position at least some of the landing gear on the wings. Yet, wings cannot bear heavy weight or excessive stress. Thus the design of the landing gear—an element critically important to safety has to be compromised. Ideally, the right and left sections of the gear must be separated as far as possible to provide the maximum balance for a landing airplane. Yet the fragile tips of the wings can not bear the weight or the plane and the shock of landing transferred through the landing gear. The gear has to be positioned close to the fuselage, compromising stability, particularly during high-wind landings and take-offs. To fit in the wings, the gear itself has to be small, and lightweight, lacking proper shock-absorbing capacity. Yet, the gear must be long enough to accommodate low-hanging engines and the bottom of the fuselage. These compromises limit the effectiveness and safety of the gear and restrict landings to smooth concrete surfaces.

Limited area of the wing leads to large wingspans, which in turn limits takeoffs and landings only to specially-prepared wide strips. Landings, of passenger planes, even on wide highways with trees or poles on the sides, are often impossible. Large winged planes also require airstrips of great length, often three to four miles long, to achieve minimal takeoff speed of 220-280 km/hr. Achievement of such speeds by a multi-ton giant, on the ground, is inherently dangerous. Slightest mistakes by the pilots, debris on the runway, blown gear tire, can all lead to a disaster. The danger is further exacerbated by inadequate compromised gear of modern airplanes. Furthermore, such speeds on the ground create tremendous stress on the gear, and the structure of the airplane, contributing to wear.

Traditional airplane construction has a long narrow fuselage and a tail part, usually comprised of three rudder wings. These rudder wings carry out the function of in-flight stabilization and provide for maneuverability. These separately-positioned rudders create additional drag and reduce efficiency. Further, the front of the fuselage of most transport and passenger planes have a very low fineness ratio inherent in the design, thus encountering tremendous drag at airborne speeds. Similarly, the wings can not have a high fineness ratio, to ensure sufficient lift coefficient.

As a result of this resistance to airstreams/drag, inherent in modern airplane designs, the speeds of travel are limited. Numerous curvatures and surfaces perpendicular to air streams, common in modern airplanes not only reduce the efficiency of the plane, but also lead to loud shock waves and great loss of energy as aircraft nears the speed of sound. Furthermore, at high speeds, such as those encountered by high-speed airplanes and space shuttles (of basic winged airplane design), the drag produces enormous heat, requiring the use of expensive and often heavy and unreliable thermal protection materials on the body of the plane.

The length of the fuselage, particularly on longer passenger and transport planes severely limits the take-off angle. An excessive take-off angle causes the rear of the airplane to strike and scratch the ground. Limited take-off angle further necessitates and limits airplanes, even those with engines powerful enough for steep take-off, to longer runways.

The structure of the modern airplanes, greatly favors, and often necessitates, the placement of engines below the wings. This seriously hinders emergency landings, particularly on water. The engines, dipping into the water during the landing, usually tear off the wings and destroy the fuselage.

The aviation's requirements for more powerful, reliable and quite engines necessitates larger engine sizes. Larger heavier engines require thicker and longer wings, which further increases the weight of the airplane and the drag. Due to the necessary placement under the wing of the airplane, the diameter of the engine is limited to less than the height of the plane's wings above the ground. The solution to the latter problem was found in increasing the height of the landing gear, and thus raising the wings higher above the ground. Yet, this in turn further increases the overall weight of the airplane and raises the center of gravity. The result is further decrease of plane's stability on the ground, complicated servicing, impossibility of belly landings in cases of gear malfunction, and overall decrease in safety.

The tubular vehicle of the present invention overcomes all of the shortcomings of winged airplanes, described above. In addition, the design of the tubular vehicle provides some distinct advantages. For example, it allows for creation of the plane of high constructive rigidity, with vehicle being compressed together at high speeds and sharp turns, instead of being pulled apart, as with today's aircraft. The tubular vehicle allows for high fineness ratio of all parts, including the nose part of the airplane, allowing for efficient flight at all heights and speeds, including supersonic speeds. The new design allows for more efficient rudders and maneuverability. It allows for greatly improved load capacity and planing ability at the same time. It allows for larger, simpler, and more reliable gear. It allows for combination or separate use of turbines and rocket engines to allow the use of the new vehicle in upper stratosphere and as a space shuttle.

The new design allows for takeoffs at extreme angles and nearly vertical landings. Furthermore, as most of the planing surfaces of the tubular vehicle are in or on the body of the vehicle itself, there is no need for long wings. This, in combination with capacity for better landing gear would allow for landing on narrow roads and rough landing strips. The new vehicle would not require the enormous hangar spaces necessary for today's aircraft, all leading to greatly reduced investments in upkeep and infrastructure.

The adherence to the traditional wing design has stalled the development of aviation in the last half a century. While most fields of technology have experienced radical revolutions in recent decades, there is very little difference in speed, comfort and safety characteristics between the airplanes designed in the 1960s and those being made today. In the era of open borders and global economies, a new type of an airplane is required that would overcome the limitations and compromises inherent in the design of today's aircraft and allow for further development of aviation. The tubular vehicle of the present invention achieves this objective and provides numerous other benefits.

SUMMARY OF THE PRESENT INVENTION

The present invention is defined by the following claims and nothing in this section should be taken as a limitation on those claims.

The air transport vehicle of the present invention comprises a tubular body. The tubular body comprises an upper half and a lower half. The upper half is positioned above the lower half. The upper half and the lower half are connected to each other, forming a bore between the upper half and the lower half. The bore extends longitudinally from the nose end of the vehicle to the tail end of the vehicle. The vehicle also comprises at least one propulsion device, preferably positioned within the bore. In some cases, the at least one propulsion device may be a combination of several different types of engines, such as turbofan and rocket engines, for example.

The preferred embodiments of the vehicle further comprise at least one bulkhead connecting to the upper half and the lower half. The bulkhead extends longitudinally inside the bore, dividing the bore into parallel subsections. The preferred embodiment comprises one bulkhead, although other embodiments may comprise multiple bulkheads. Bulkheads may have hollow space inside, which can be used for cargo and passenger transport, among other uses. Bulkhead may also comprise a vertical (i.e. vertically extending) rudder.

In some variants of the invention, the top surface and the bottom surface of each half converge to a sharp horizontal edge in the front of each half. The surfaces then vertically diverge from each other toward the middle portion of the vehicle, thus forming inner cavities between the top surface and the bottom surface of each half. These cavities may also be used to hold cargo, passengers, fuel, etc.

In preferred embodiments, external slants exist in the nose end of the vehicle 10. These external slants are positioned at such an angle of reflection to the oncoming airflow, that the greater the speed of the vehicle is, the more resistance the external slants encounter, the harder is the force compressing the upper and the lower halves of the vehicle together. Thus, the greater the external stress experiences by vehicle 10, the stronger and more rigid the construction becomes.

Some embodiments of the vehicle also comprise a landing gear with wheels. These wheels can be and are preferably larger than those on conventional airplane, allowing for shorter takeoffs and safer landings. At least some of the wheels are positioned in the tail portion of the lower half. The landing gear may also comprise a wheel spin-up mechanism, with one or more spoon-shaped blades. The variants of the vehicle, intended for takeoffs and landings on water may comprise a plurality of raised bands on the bottom surface of the lower half. These bands extend longitudinally from the nose end of the vehicle to the tail end of the vehicle and are intended for conducting a layer of air or air bubbles between the vehicle and the water, thus reducing friction.

The method of launching the vehicle from a special launch carriage is also described and claimed.

BRIEF DESCRIPTION OF THE DRAWINGS

FIG. 8 also illustrates, the platform, rotatably attached to the bulkhead, for stowing engines away in the bulkhead at high speeds.

FIG. 14 shows the vehicle of the present invention taking off from the carriage.

FIG. 15 is the close-up of the section of the rail track, with the carriage, used for launching the vehicle of the present invention in FIG. 14.

DETAILED DESCRIPTION OF THE PREFERRED EMBODIMENT

Figure 1:
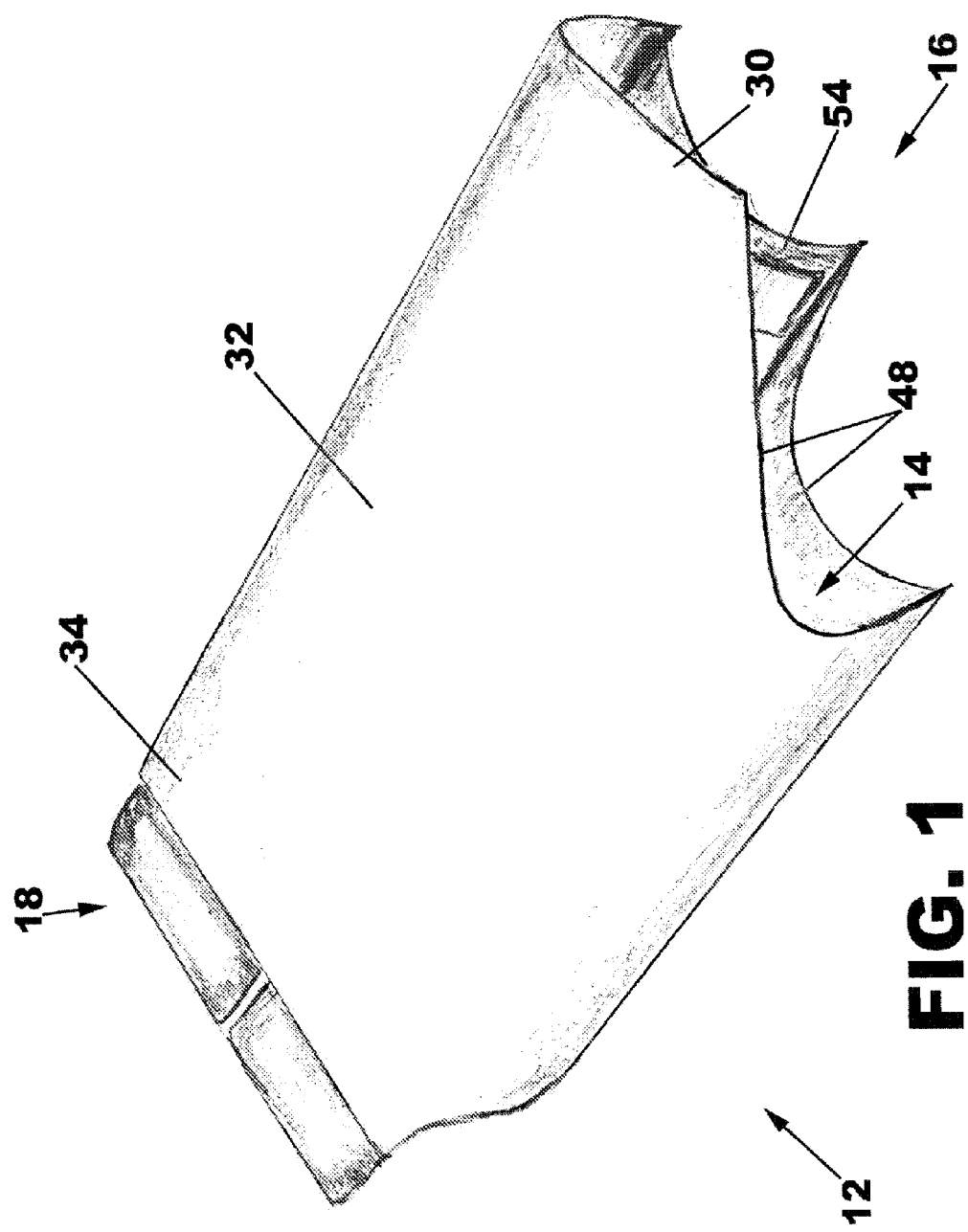
FIG. 1 is a top perspective view of one of the preferred embodiments of the air transport vehicle of the present invention.

The apparatus of the present invention will now be illustrated by reference to the accompanying drawings. Preferred embodiments of the tubular transport vehicle (the Vehicle, or the Tube) of the present invention have been assigned reference numeral 10. Other elements have been assigned the reference numerals referred to below.

The device 10 of the present invention comprises a tubular body 12. The term "tubular," refers to a body structure, substantially open on both sides, with at least (and preferably) one central bore 14 (See FIG. 1, FIG. 10), otherwise referred to as tunnel 14, extending longitudinally from the nose end 16 of the vehicle to the tail end 18 of the vehicle. The term "tubular," is not intended to necessarily imply a circular cross-section of the body. In fact, in preferred embodiments, such as the ones shown on FIGS. 1, 5, and 8, the cross-section of the body is more rectangular than circular.

The central bore 14 is formed by and is located/sandwiched between the upper half 20 and the lower half 22. The term "upper half" 20 refers to the top section of the vehicle 10, shown above the dotted horizontal midline on the traverse cut, shown on FIG. 5. The term "lower half" 22 refers to the bottom section of the vehicle 10, shown below the dotted horizontal midline on the traverse cut, shown on FIG. 5. The upper half 20 is positioned above the lower half 22, with both halves being integrally connected to each other. In most and in preferred embodiments, the halves are integrally connected by mostly vertical side walls 24 (see FIG. 5), extending from the upper half 20 to the lower half 22.

The nose end 16 of the vehicle 10 (nose 16) roughly refers to the front part of the vehicle 10 in relation to the direction of flight. The tail end 18 (tail 18) of the vehicle 10 refers to the rear part of the vehicle 10 in relation to the direction of flight.

Figure 8:
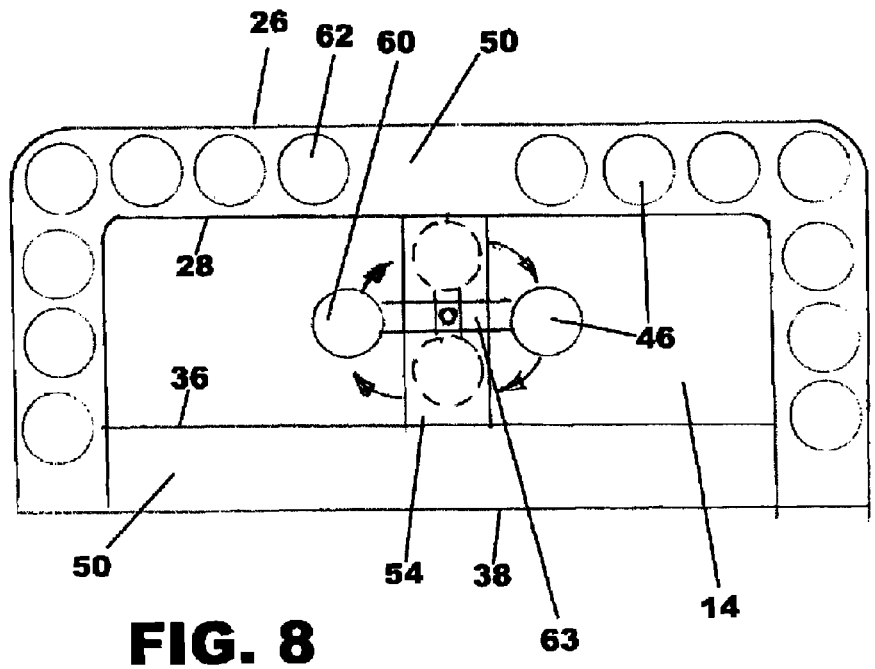
FIG. 8 is a cross-sectional view of the embodiment comprising a combination of turbofan engines and rocket engines.

The upper half 20 comprises top surface 26 of the upper half 20 and bottom surface 28 of the upper half 20 (see FIG. 8). In most embodiments top surface 26 of the upper half 20 is the topmost surface of the vehicle 10, although in some embodiments additional structures may rise above the top surface 26. Bottom surface 28 forms the bottom of the upper half 20 and, simultaneously the ceiling of the bore 14/tunnel 14. Nose portion 30 of the upper half 20 refers to the general section of the upper half 20 in the nose end 16 of the vehicle 10. Middle portion 32 of the upper half 20 and tail portion 34 of the upper half 20 refer to the general sections in the upper half 20 towards the middle and the end of the vehicle 10 in relation to the direction of flight.

The lower half 22 comprises top surface 36 of the lower half 22 and bottom surface 38 of the lower half 22 (see FIG. 8). In most embodiments top surface 36 of the lower half 22 is the floor of the bore 14/tunnel 14. Bottom surface 38 forms the bottom of the lower half 22 and, simultaneously bottom surface of the vehicle 10, although in some preferred embodiments additional structures, such as gear may extend below the bottom surface 38. Nose portion 40 of the lower half 22 refers to the general section of the lower half 22 in the nose end 16 of the vehicle 10. Middle portion 42 of the lower half 22 and tail portion 44 of the lower half 22 refer to the general sections in the lower half 22 towards the middle and the end of the vehicle 10 in relation to the direction of flight.

The vehicle 10 further comprises at least one propulsion device 46. Although the propulsion device can be of any kind now known or later invented, capable of propelling vehicle 10, in the preferred embodiments, propulsion devices such as turboprops or rocket engines are used.

In the preferred embodiment, the top surface 26 of the upper half 20 and the bottom surface 28 of the upper half 20 converge to a sharp edge 48 (See FIG. 9, FIG. 1, FIG. 3) at the nose portion of the upper half, but vertically diverge from each other toward the middle portion of the upper half 20, thus forming an upper inner cavity 50 between the top surface 26 of the upper half 20 and the bottom surface 28 of the upper half 20.

Figure 6:
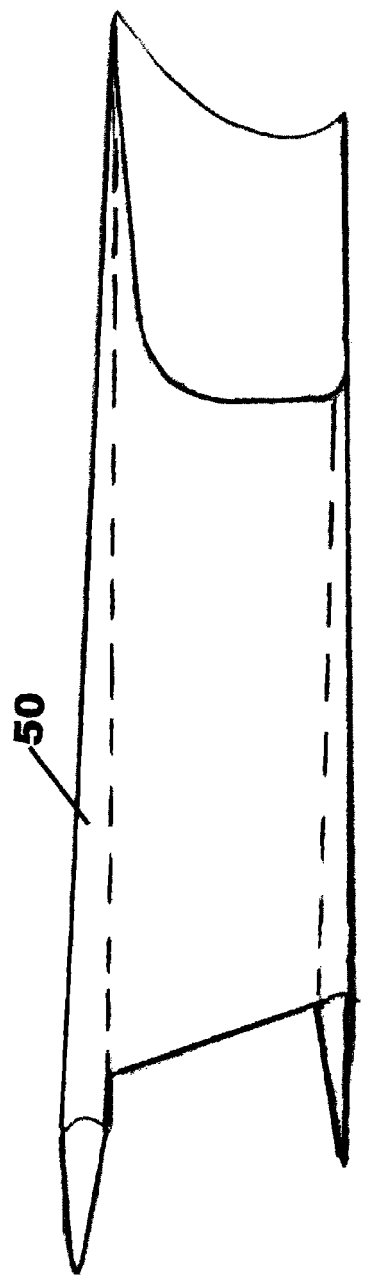
FIG. 6 is a side view of another embodiment of the air transport vehicle of the present invention.

Thus, the nose end 16 is comprised of a continuous sharp edge, forming the front of the nose end. The term "sharp" should not necessarily be interpreted as a cutting-sharp, or a razor-sharp edge, but an edge that can "cut" through air with little drag. Such an edge, gradually expanding towards the rear of the vehicle 10 allows for creation of an aircraft with extremely high fineness ratio. This in turn allows for low air resistance and fuel-efficient air travel. Most importantly, absence of pronounced angles in the construction allows the vehicle 10 to exceed sound barrier, with minimal "sonic boom." Sonic booms have been the plague of modern aircraft, draining aircraft's energy and fuel, and disturbing people on the ground, all leading to the ban of supersonic flights over the populated area and freeze in the development of cargo and passenger supersonic aircraft. The design of the vehicle 10, with sharp edges 48 allows to overcome this problem In preferred embodiments, cavity 50 has a conical shape (FIG. 6) and extends through most of the length of the upper half 20, creating usable space inside of the upper half 20. Such space (cavity 50) may be used as a pilot's cabin, a passengers' compartment, a cargo space, a fuel storage, an engine compartment, etc.

Figure 9:
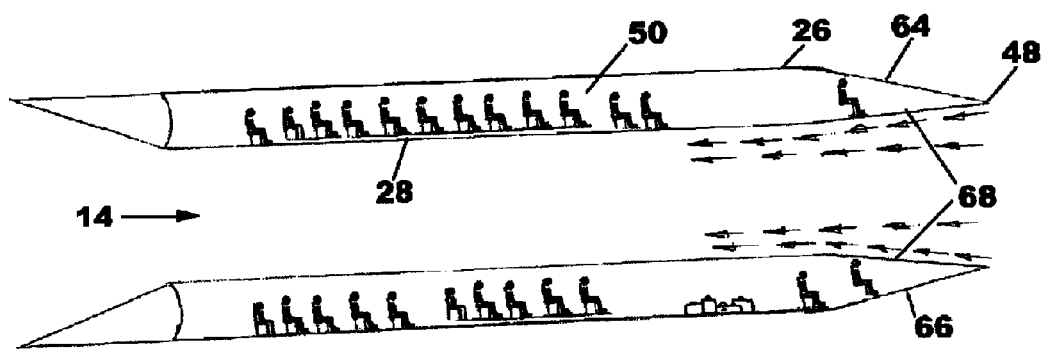
FIG. 9 is a side sectional view of one of the preferred embodiments the air transport vehicle of the present invention, illustrating, among other things, the use of the cavities in the upper and lower sections for passenger and cargo transport, as well as external and internal slants.

A similar cavity 50 may exist in the lower half 22 as well, being similarly created by the convergence to a horizontal edge of the top surface 36 of the lower half 22 and the bottom surface 38 of the lower half 22 in the nose portion of the lower half and their vertical divergence from each other toward the middle portion of the lower half 22. Preferably, particularly in larger vehicles 10, cavities 50 are present in both the upper and the lower half, providing two levels of useful cargo-passenger (or other) space, as shown in FIG. 9. Other versions of the vehicle 10, such as smaller fighter-plane embodiments, like the one shown in FIG. 2, may have the cavity 50 only in the upper half, only in the lower half, or absent altogether.

Figure 2:
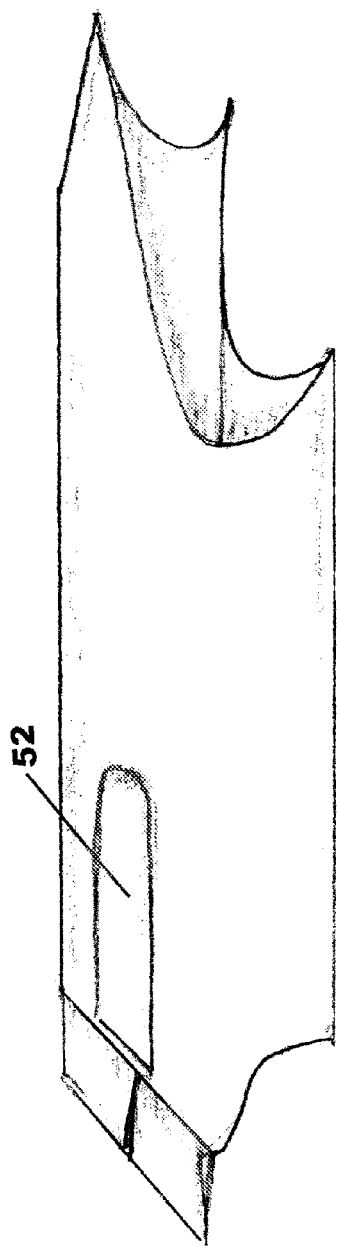
FIG. 2 is a right perspective view of another preferred embodiment of the air transport vehicle of the present invention, comprising a detachable cockpit.

In embodiments, where the cavity 50 is absent altogether, external features, such as a detachable cockpit 52 (cockpit 52) on FIG. 2 may be added to create useful space. Pilots, utilizing cockpit 52 positioned on the top surface 26 have a distinct safety advantage over pilots utilizing cockpits in modern winged planes. To escape the plane in case of an emergency, pilots currently have to utilize the high-powered catapult to be shot out above the vertically-extending rear rudder assembly. Since preferred embodiments of the vehicle 10 comprise no vertically-extending rear rudder assembly, the pilot in the cockpit can simply disconnect from the tubular body 12 and slide back together with the cockpit. Such a cockpit, particularly if exhibiting some planing characteristics and/or equipped with an engine, can act as a safety escape shuttle for pilots and astronauts at any height and speed.

In the preferred embodiments of the vehicle 10, the tubular body 12 comprises at least one bulkhead 54. The bulkhead 54 is preferably a vertical wall, connecting the upper half 20 and the lower half 22. The bulkhead extends longitudinally (i.e. in the direction from the nose end 16 to the tail end 18) inside the bore 16 thus dividing the bore 16 into parallel subsections. Among other advantages, the bulkhead 54 provides additional rigidity to the construction of the vehicle 10. The bulkhead 54 also acts as a vertical stabilizer. Preferably, the rear/tail section of the bulkhead 54 comprises at least one vertical (i.e. vertically-positioned) rudder 56, for controlling the horizontal direction of the aircraft. The rudder is thus positioned inside, or just outside the bore, eliminating the need for a rudder to extend above the top surface 26. In embodiments, where the capacity for sharp turns is required of the vehicle 10, such as in the role of military fighter aircraft, the rudder 56 or additional rudders 56 may be installed in the front/nose section of the bulkhead 54.

Additional vertical rudders, 56 may also be installed on the vertical side walls 24, both in the nose and/or tail sections of the aircraft. If positioned in the nose end 16 of the vehicle 10, the rudders may be also be used for braking/drag and to direct and adjust the flow of air through the bore 14, thus adjusting the air pressure within the tube and thus also the concentration of air flowing towards the engines. For example, two vertical rudders 56 on two opposing vertical side walls, in the nose end of the vehicle 10 maybe turned in directions away from each other, thus widening the "mouth" of the bore 14. They may also be turned towards each other to narrow the "mouth" of the bore 14 and channel the oncoming airflow along the outer surfaces of the vehicle 10. Similar and/or additional function of controlling the air flow into the bore 14 may be achieved by horizontally-positioned flaps in the nose end 16, if such flaps are attached to the upper section 20 and the lower section 22. The ideal air pressure inside the bore varies with speed, altitude, the type of motors utilized in a particular embodiment of vehicle 10, and other characteristics.

Figure 7:
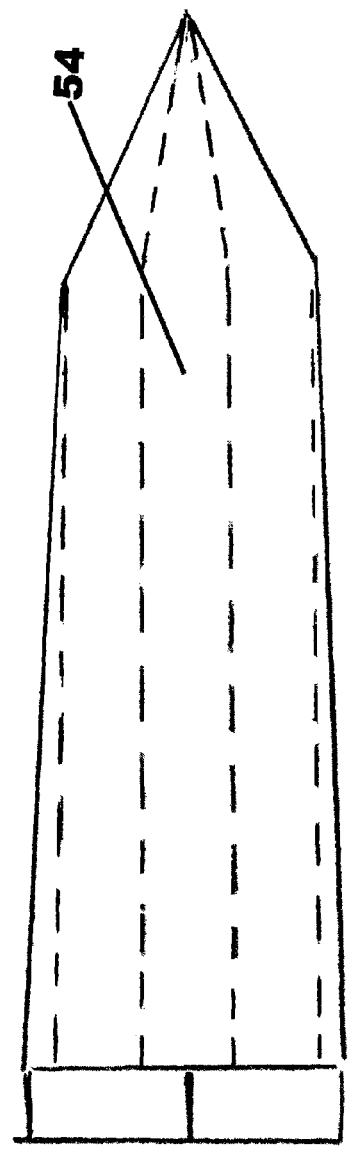
FIG. 7 is a top view of the embodiment of FIG. 6.

To assure the lowest possible drag, in the preferred embodiment, the front end of the bulkhead 54 is shaped as a sharp vertical knife blade, gradually expanding and leveling to a straight surface past the nose end 16 of the vehicle 10, as can be seen from the top view of FIG. 7. Preferably bulkhead 54 also comprises a hollow space or a cavity, extending longitudinally inside the bulkhead 54. Such hollow space/cavity inside the bulkhead 54 provides additional useful space for passengers, cargo, fuel, etc.

Although the preferred embodiment, shown on FIG. 1 comprises one bulkhead 54, other embodiments may require no bulkheads 54 or a plurality of parallel bulkheads 54. A plurality of bulkheads 54 may be particularly useful, for example, on larger and/or wider embodiments of the vehicle 10, where greater constructive rigidity, passenger/cargo space, stability and maneuverability is required.

Instead of the wings, the vehicle 10 primarily utilizes the surfaces 28 and 38 for planing. Unlike in a conventional modern airplane with one level of planing surface, the vehicle 10 has at least two levels of planing surfaces. And the planing surface area extends almost the entire length of vehicle 10. This allows for a much greater planing capability, in a body much narrower than that of the modern winged airplane.

Figure 3:
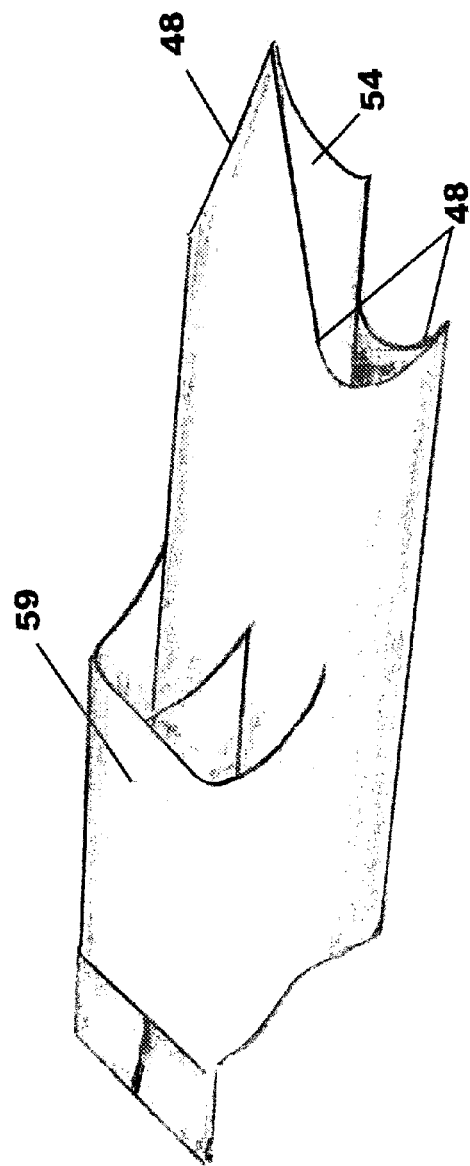
FIG. 3 is a right perspective view of another preferred embodiment of the air transport vehicle of the present invention, comprising an additional vertical level.
Figure 4:
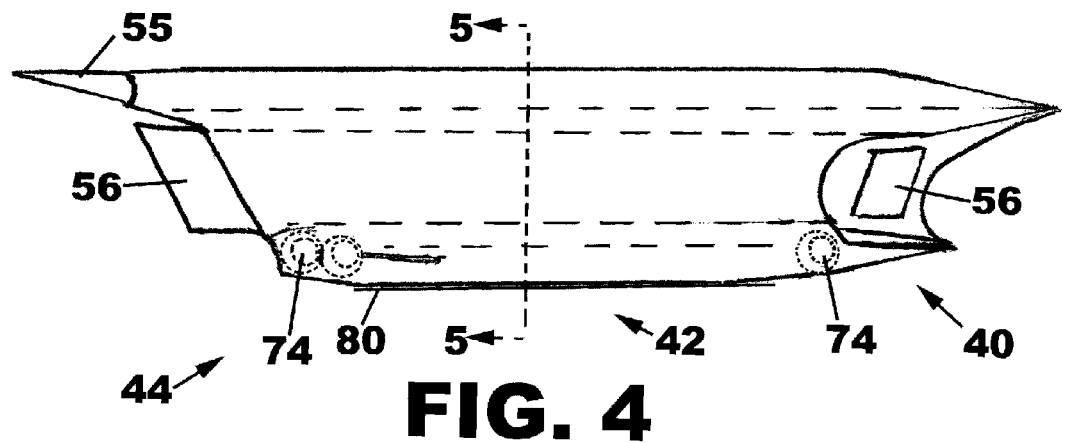
FIG. 4 is a right side view of the preferred embodiment of the air transport vehicle of FIG. 1.

In some cases, where still greater planing ability is required, the vehicle 10 may comprise further planing surfaces. For example, it is foreseeable that due to the narrow width, short takeoff and landing, and ability to use existing city infrastructure, vehicle 10 may be used as a city taxi. In such cases, even more planing and/or storage capacity may be desirable, without increasing the width of the vehicle 10 (so that the city variant would be able to fit into a highway lane). To achieve this goal, one or more additional levels with planing surfaces may be attached on top of the upper half 20. One such multi-level embodiment is shown in FIG. 3. In this preferred embodiment, the additional level 59 is somewhat shorter, but constructively similar to main tubular body 12 below it, in that it comprises a bore, a bulkhead, sharp edges, etc. However, in other multi-level embodiments additional planing capacity may be achieved by a simple T-shaped wing, or a car-spoiler type wing, or any other similar type of planing surface attached to the top surface 26.

In yet other embodiments, there may be more than one additional level above the upper half 20. In fact, because most of the planing surfaces of the vehicle 10 are located either within or on the surfaces of the tubular body 12, the construction of the vehicle 10, allows joining together of several vehicles 12 in almost any parallel configuration, be it on top of one another, or side by side without dramatically effecting aerodynamic characteristics. This feature may be particularly useful for creating a "wing" of several vehicles 10 for transporting of heavy or oversized load, rebasing a whole fleet of vehicles 10 by one pilot, or providing a safe, stable and reliable in-flight refueling.

Figure 11:
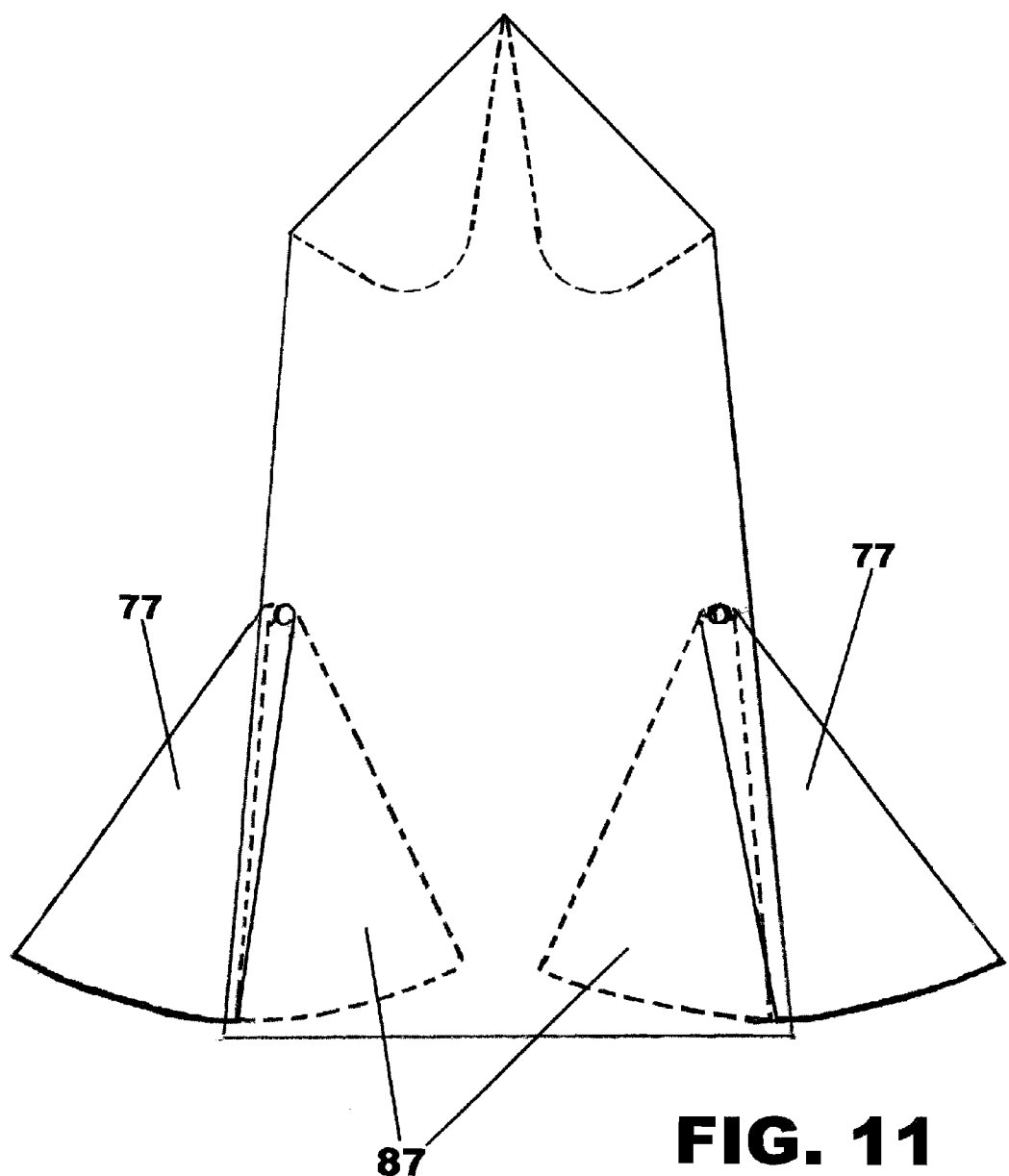
FIG. 11 illustrates the top view of the embodiment, comprising a pair of retractable horizontal wings (in retracted position) and a pair of wing compartments.

Some embodiments of the vehicle 10 may comprise extendable horizontal wings 77, as shown in FIG. 11 to provide additional lift in emergency situations, or during takeoffs, landings, and transportation of heavy loads. In the vehicle shown on FIG. 11, the retractable horizontal wings 77 extend out of the upper half 20, and retract into the wing compartments 87 in the upper half 20, when not required.

In the preferred variants of the invention, the surface of the upper half 20 is extended further backward and further forward than the lower half 22 (See FIG. 2). This creates additional planing capacity, and resistance from dropping back at low speeds and critical angles of the nose. Preferably, the tail section 34 of the upper half 20 comprises one or more horizontal flaps 55, said flaps primarily used for providing drag, when required and adjusting the vertical direction of the aircraft. The flaps may be attached to the upper half 20 and the lower half 22. In preferred embodiments, the flaps are attached to the rear end of both the upper 20 and the lower 22 halves of the vehicle 10. As described above, in some embodiments, the flaps 55 may also be attached in the front end 16 of the vehicle 10.

The vehicle 10 allows for multiple points of placement of propulsion device 46 or engines 46. The propulsion devices 46 of almost any type, size and number may be attached to the upper surface 26 and vertical side walls 24. As in most embodiments there are no structures extending from the upper surface 26 and vertical side walls 24, there will be little or no interference with engine intake and exhaust, thus allowing for the positioning of the engines with the only concern for maximum efficiency. Certain types of propulsion device 46 may also be positioned in the cavity 50, provided that in such embodiments cavity 50 is open in the tail end 18 of the vehicle 10.

In the preferred embodiment, however, the propulsion device 46 is positioned inside the bore 14. The increase in height of the bore 14 requires only the lengthening of the vertical side walls 24, which does not effect the planing surfaces, and only insignificantly adds to the weight of the vehicle 10. Thus, vehicle 10 may be designed with large bore 16, capable of accommodating propulsion device(s) 46 of almost any size. Ability to accommodate large, and therefore generally more powerful, quiet, reliable, and energy-efficient engines gives vehicle 10 a distinct advantage over winged airplanes, where the engine size is severely limited by the height of the wings above the ground.

In embodiments comprising the bulkhead 54, and where the propulsion device 46 is positioned inside the bore 14, it is preferable that the propulsion device 46 be attached to the bulkhead 54 (See FIG. 8). It is also preferable in such cases, for vehicle 10 to comprise an even number of the propulsion devices 46, with equal number of propulsion devices 54 positioned on each side of the bulkhead 54.

The propulsion devices 46 may be of one type, such as high-bypass turbofan engines, or a combination of types. FIG. 8 demonstrates a preferred embodiment of the vehicle 10, comprising a combination of turbofan engines 60 and rocket engines 62. As turbofan engines are quieter and better suited for takeoff and subsonic flight, the vehicle of FIG. 8 would take off under the power of the turbofan engines 60. Then, as the aircraft reaches high altitudes, rocket engines 62 would turn on and further accelerate the vehicle 10. As the aircraft is accelerating to supersonic speeds, the turbofan engines within the bore 16 would be hinder the acceleration by creating drag. For this reason, in the embodiment shown on FIG. 8, the turbofan engines 60 are positioned on a rotatable platform 63. As rocket engines initiate, turbofan engines 60 turn off. The rotatable platform 63 then rotates 90 degrees, stowing the turbofan engines inside the bulkhead 54, giving all surfaces of the vehicle 10 the angle of incidence that is most advantageous for high-speed, high-altitude and space travel. Consequently, vehicle 10 will experience much less load, resistance, and thermal effects than modern high-speed planes and space shuttles.

Aerodynamic characteristics of the vehicle 10 provide enormous structural rigidity to the construction. To achieve this rigidity, the preferred embodiments of the vehicle 10 comprise external slants. The external slants are formed by the top surface 26 of the upper half 20 and the bottom surface 38 of the lower half 22, as these surfaces slant toward the horizontal edge in the nose end of the vehicle 10. The top surface 26 of the upper half 20 forms an upper external slant 64, and the bottom surface 38 of the lower half 22 forms a lower external slant 66, as shown on FIG. 9. It is preferable that the lower external slant 66 is shorter and/or less pronounced than the upper external slant 64.

The oncoming airflow, colliding with the external slants applies downward force to the nose portion 30 of the upper half 20 and an upward force to the nose portion 40 of the lower half 22. These opposing forces compress the upper half and the lower half together. In stark contrast to the winged planes, prone to tearing apart at high speeds, the vehicle 10 gets compressed at high speeds and sharp turns, providing increased rigidity to the aircraft in situations, where it's most needed.

Some embodiments of the vehicle 10 further comprise internal slants 68, also shown on FIG. 9. The internal slants 68 are formed by the bottom surface 28 of the upper half 20 slanting toward the horizontal edge 48 in the nose end, and the top surface 36 of the lower half 22 slanting toward the horizontal edge 48 in the nose end. The internal slants 68 are shorter than and/or have a gentler slope than the external slants for encountering less drag than external slants. This ensures that the forces of compression, acting through external slants are always greater than any pull-apart forces acting through the internal slants. Thus the net force acting on the construction of the vehicle 10 is one of compression. In general, the overall air pressure acting on surfaces inside the bore must be less than that acting on external surfaces of the vehicle 10.

The purpose of the internal slants 68 is to direct the flow of air toward the propulsion device(s) 46, positioned in the bore 14. The angles of the internal slants may be adjusted, so that the streams of air coming off the internal slants are aimed directly into the inlet(s) of the engine(s) 46. In some embodiments, equipped with engines that require high air pressures for efficient functionality, the inner surfaces of the bore 14 (i.e. surfaces 28 and 36) may be shaped to converge somewhat in a section of the bore around the engines, thus increasing the air speed and pressure in that section of the bore.

In the preferred embodiments of vehicle 10 comprising no external cockpit, the pilots are preferably positioned in the nose end of the aircraft, in the front of the upper or lower cavities 50, or in the nose end of the bulkhead 54. If pilots are positioned in cavities 50, then, preferably, the external slants are made of clear see-through plastics or similar, preferably heat-resistant materials to provide observation window for pilots. In most embodiments, it is preferable that pilots be positioned in the cavity 50 of the lower half 22. In most cases, this would allow for better, less-obscured view of the landing strip. If pilots are positioned in the bulkhead 54, then preferably the nose end of the bulkhead 54 is made of clear materials. It is also expected that external observation cameras, integrated into the surfaces of vehicle 10 will be used to assist pilots in landing and observing the surroundings.

Figure 10:
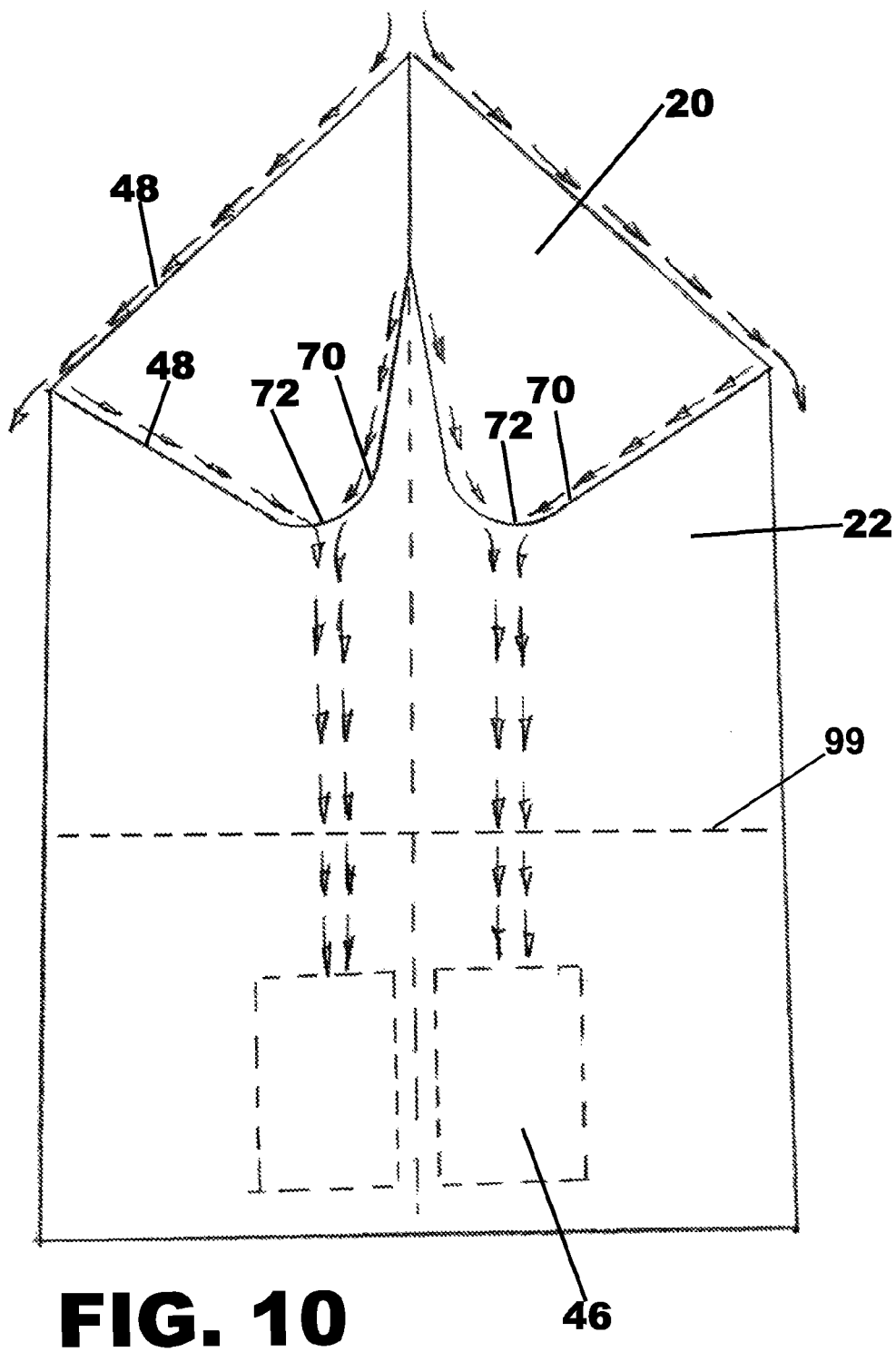
FIG. 10 illustrates, among other things, the curvatures in the front nose edge of the lower half of the preferred embodiments, and the flow of air along these curvatures and along the edge of the upper half of the vehicle.

In some preferred embodiments, such as the one shown on FIG. 10, increased airflow toward the engines 46 is achieved through at least one, and preferably two curvatures 70 in the edge 48, the curvatures 70 positioned in the nose end of the lower half 22. In general, the number of curvatures 70 in the edge 48 should correspond to the number of the engines 46. Curvatures 70 are irregularly shaped, with deepest depressions 72 positioned in-line with the engines 46. Thus, much of the air colliding with the edge 48 on the lower half 22, will flow along the edge 48 toward the deepest depressions 72 (as indicated by arrows on FIG. 10). There, the streams of air, coming from opposite directions, collide and combine into a single high-speed, high-pressure flow of air hitting the turbofan or another type of propulsion device 46.

In the preferred embodiments, there is no need for curvatures 70 on the upper half 22. It is desirable that the air, colliding with the edge 48 on the upper half 20, travel along the edge 42 and off to the side of the vehicle 10, as illustrated on FIG. 10. This flow of air away from the upper half 20, creates an area of low pressure, along the entire top surface 26. The area of low pressure above the vehicle 10 facilitates lift.

The tubular structure of the vehicle 10, allows for simple and reliable protection of engines 46, located within the bore 16, from birds and debris. Such protection can be achieved through the use of simple nets 99, extendable inside the bore 16. In the preferred embodiments, with the bulkhead 54 and an engine attached on each side of the bulkhead 54, there are two nets 99, intended to cover sections of the bore 16 on both sides of the bulkhead 54. The nets 99 are made of flexible materials, such as wire or plastics, and are stored rolled up inside the bulkhead 54. When the vehicle 10 enters into the zone of bird flight, such as during landing or takeoff, the net 99 extends at an angle to the flow of air, under the power of electric motors, along the rails or grooves (in the bottom surface 28 of the upper half 20 and the top surface 36 of the lower half 22), to create a net shield in front of the engines 46. Preferably, the nets are positioned in primarily vertical position, and are located as close as possible to the nose end 16 of the vehicle 10, so that the distance between the nets and the engines 46 is maximized. Such positioning ensures that any resistance and turbulence created by the nets has little effect on the engines 46.

As described above, on winged airplanes common today, the side/rear wheels of the landing gear are positioned on the wings. The wings, together with the gear are located about half-way down the length of the aircraft, leaving the rear of the aircraft suspended in mid-air. This suspended, unsupported rear section, strikes and scratches the ground if the nose of the airplane raises above a certain angle. This prevents sharp-angle take-offs and increases the required take-off strip length.

The construction of the preferred embodiments of the vehicle 10 avoids the problem above by comprising a landing gear, with wheels 74, where at least some of the wheels 74 are positioned in the tail end 18, preferably towards the very rear of the aircraft. This allows the vehicle 10, to raise its nose end 16 to almost any angle, while the tail end 18 remains supported by the wheels of the landing gear. As vehicle 18 does not store the landing gear in thin and fragile wings, as modern airplanes do, but rather in the cavity 50 of the lower half 22, or in compartments in the bottom surface 38, the gear is not as limited in size and weight. Furthermore, as the bottom surface 38 of the preferred embodiment is relatively flat, the gear does not need to be extended far, and does not need to be mounted on long and heavy vertical shafts used in the modern airplanes to overcome the height of the low-hanging engines and fuselage. The shafts 90 can be shorter, slanted (as shown on FIG. 12), or even be absent altogether. In the preferred embodiments of vehicle 10, the wheels of the gear can be made (and preferably are) of much greater diameter than on comparably-sized winged airplanes. The wheels 74 of greater diameter allows for steeper take-off angles (and thus shorter runways), as well as for takeoffs and landings from rough unprepared surfaces.

Figure 12:
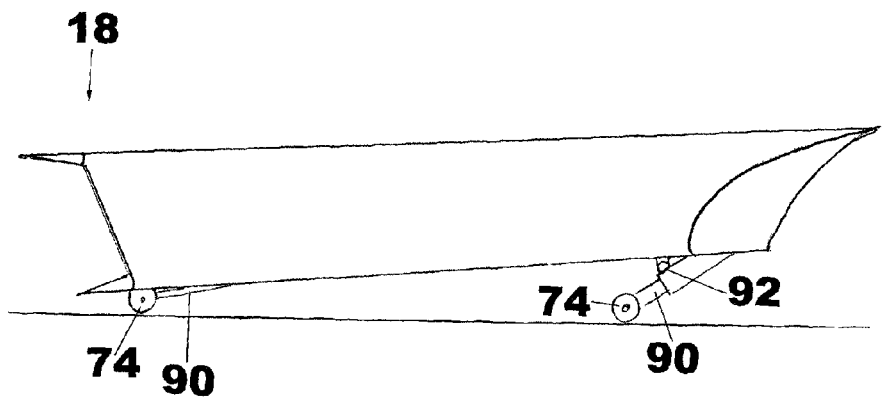
FIG. 12 illustrates one of the preferred embodiments at takeoff, showing, among other things, the wheels, located in the tail end of the vehicle and the front suspension, raising the nose end of the vehicle.

In the preferred embodiments, the functionality of the gear is further improved by the presence of the suspension (such as wishbone suspension) on the front and rear wheels of the gear. This allows for installation of shock-absorbers that are far more effective than the vertical shock absorbers of today's airplanes (FIG. 12). Furthermore, in the preferred embodiments, jacking/extension of the front suspension 92 at the time of takeoff allows to raise the nose-end 16. This instantly increases the surface area perpendicular to the oncoming airflow, thus producing lift and shortening the takeoff distance.

Figure 13:
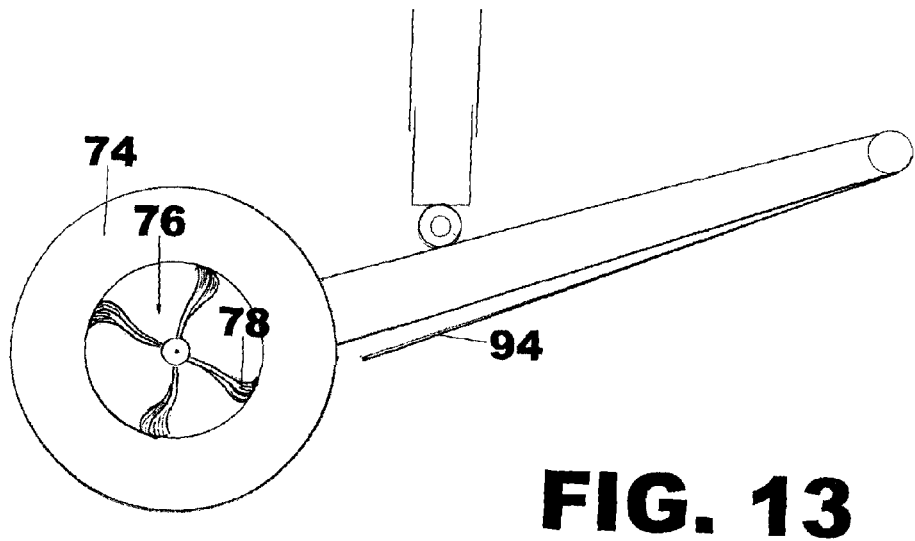
FIG. 13 illustrates, among other things, the wheel of the preferred embodiment of the vehicle 10.
Figure 16:
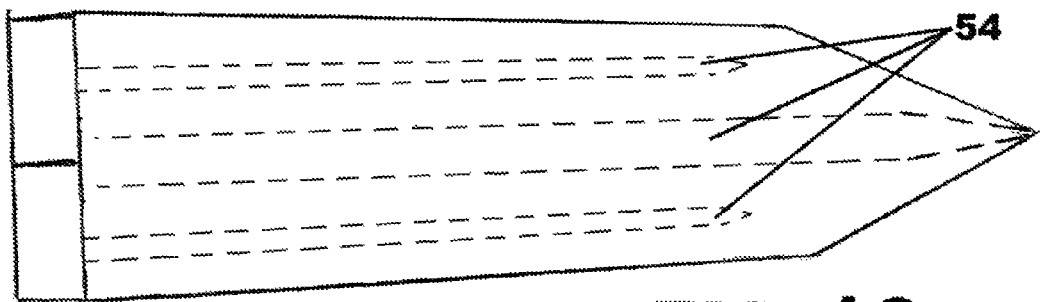
FIG. 16 depicts a top view of an embodiment comprising a plurality of bulkheads.

In order to ensure soft smooth landings and decrease the stress and accompanying wear on the wheels 74 during landings, the preferred embodiments of the vehicle 10 comprise a wheel spin-up mechanism 76 (See FIG. 13). The wheels 74 of the preferred embodiments comprise at least one, and preferably several spoon-shaped blades 78 with rough inner surfaces, for grabbing air. The spoon-shaped blades 78 are attached to the sides, preferably to the rims of the wheels 74. When the wheel, with the spin-up mechanism 76 is released in the air, the spoon-shaped blade 78 act as sails, catching the headwind in concave inner surfaces and forcing the wheel 74 to rotate. The spin-up mechanism 76 achieves a dual purpose of spinning up the wheels, and providing additional drag to slow the vehicle 10 on descent.

The efficiency of the wheel spin-up mechanism 76 may be improved by sinking/recessing the upper half of the wheel 74 into the body of the vehicle 10, so that only the lower part of the wheel 74, with inner concave surfaces of the spoon-shaped blades facing the headwind is open. This allows the wind to act on inner concave surfaces open to the wind, but not the covered outer convex surfaces, applying all force of the wind to spinning the wheel in one direction only. Similar effects (of exposing only the lower part of the wheel 74 to the headwind) may be achieved by using a car fender-type cover over the top of the wheel. Additionally, a number of wind guides, such as the wind guide 94, shown on FIG. 13, and other simple mechanical adaptations, well known to those skilled in mechanical arts, may be used to direct additional flow of headwind into the rough concave surfaces of the spoon-shaped blades.

The predominantly smooth surfaces of the vehicle 10 make it particularly well-suited for service as water-based or amphibious aircraft, or even a high-speed boat. The same embodiment of the vehicle 10 may use the wheels 74 for takeoffs and landings on the ground, yet be capable of stowing the wheels and floating on water. High surface area of the body and presence of cavity 50 in the lower half 22 allow for good floatability, without the requirement of extra floats, necessary in most winged amphibious aircraft. In contrast to modern amphibious planes that must "plow" through water with their floats, and then carry them as extra weight in flight, the bottom surface 38 of the vehicle 10 glides on top of the water, with little resistance.

Figure 5:
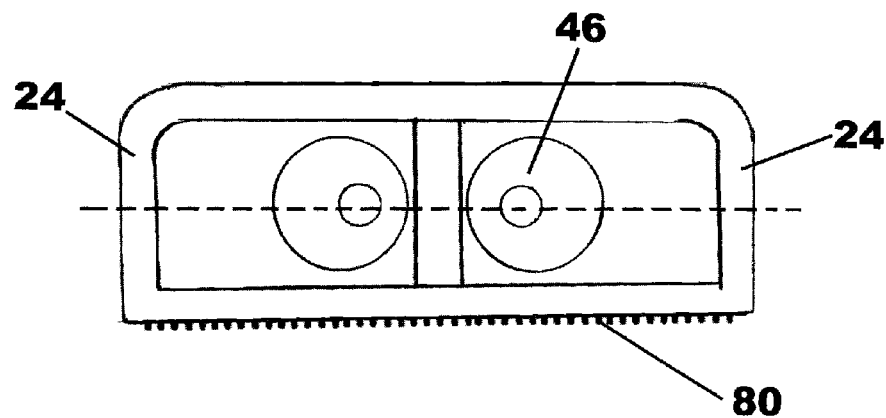
FIG. 5 is a sectional view taken along the lines 5-5 of FIG. 4.

In order to reduce the friction with water surface even further and to overcome the cohesion with water at takeoff, some embodiments of the vehicle 10 comprise a plurality of raised ribs 80 or bands 80 on the bottom surface 38 of the lower half 22 (see FIG. 5). These bands 80 extend longitudinally from the nose end of the vehicle 10 to the tail end of the vehicle 10. As the vehicle 10 accelerates on water, air trapped between the adjacent bands 80 travels along these bands under the bottom surface 38. Air, under the bottom surface 38, creates a layer of lubrication between the water and the vehicle 10, virtually eliminating friction. Alternatively exhaust from engines 46 or any other gas from compressors aboard the vehicle 10 may be channeled into the spaces between raised bands 80. For example, such gases may be released from apertures located between the raised bands at the nose end 16 of the vehicle 10.

Engines 46, with variable direction of thrust may also be particularly beneficial for achieving acceleration on water.

As mentioned above, streamlined construction and other features of the vehicle f make it particularly well suited for high speeds, and use as a space shuttle. Embodiment shown on FIG. 8 and comprising the rocket engines 62 is particularly adoptable for the task. In this embodiment the cavity 50, located in the lower section 22 serves as living and working quarters for the astronauts.

In today's space launches, most of the fuel is used up in the initial seconds of the flight for initial lifting and acceleration of the space shuttle. Rocket-powered liftoffs of today are dangerous, expensive, and create enormous amounts of pollution. Present invention offers alternative lift-off method, suitable for vehicle 10 and other space vehicles capable of atmospheric flight.

Prior to space flight, vehicle 10 would presumably be heavy, with useful load and maximum amounts of fuel onboard. Acceleration and takeoff would thus require great expenditures of energy. In order to conserve rocket fuel, required in great quantities for space flight, and maximize useful cargo capacity of such space shuttle embodiments, it is preferable to launch space shuttle embodiments of vehicle 10 from a special launching carriage 95. To prepare for launch, the vehicle 10, with retracted wheels 74 is loaded on top of the carriage 95. The carriage is placed on a rail track 96.

The carriage may have its own jet engines and/or other acceleration devices. In the preferred embodiments, the acceleration devices are one or more electric motors, preferably with series excitation, similar to the ones used in electric locomotives. Once the carriage accelerates to (or above) the speed sufficient for flight, vehicle 10 separates from the carriage and takes off under its own power.

It is also preferable that, a rail track 96 be positioned at an upward angle, as shown in FIG. 14, at least in the area of the track where the carriage 95 is likely to have reached the speed sufficient for flight of the vehicle 10. The upward angle in the track exposes greater surface area of the vehicle 10 to the oncoming air flow, and provides an upward push to the vehicle 10, prompting the separation from the carriage and takeoff.

The separation of the vehicle 10 from the carriage 95 may also be catapult-assisted. In the preferred embodiments of the invention, the separation of the vehicle 10 from the carriage 95 is further assisted by the carriage slant 98 (See FIG. 15). The vehicle 10 is placed onto the bars 100 of the carriage 95. As the carriage 95 accelerates, high air pressure created under the vehicle 10 by the slant 98 will create an upward force, lifting the vehicle 10 from the carriage 95.

Once the space flight is over, the much-lighter vehicle 10, with used-up fuel can land on its own landing gear.

It is to be understood that while the apparatus and method of this invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A heavier-than air air transport vehicle comprising:
   a. a tubular body, said body comprising
      a nose end of the vehicle
      a tail end of the vehicle
      an upper half and a lower half,
      wherein the upper half is positioned above the lower half, and wherein the upper half and the lower half are connected to each other, forming a bore between the upper half and the lower half, said bore extending longitudinally from the nose end of the vehicle to the tail end of the vehicle;
      wherein the upper half comprises:
      top surface of the upper half,
      bottom surface of the upper half,
      nose portion of the upper half,
      middle portion of the upper half,
      tail portion of the upper half;
      wherein the lower half comprises:
      top surface of the lower half,
      bottom surface of the lower half,
      nose portion of the lower half,
      middle portion of the lower half,
      tail portion of the lower half;
   b. at least one propulsion device,
   wherein
   the connection between the upper half and the lower half is integral and,
   wherein the tubular body comprises at least one bulkhead, said bulkhead connected to the upper half and the lower half, and extending longitudinally inside the bore, thus dividing the bore into parallel subsections,
   said bulkhead shaped in the form of a sharp vertical edge in the nose end of the vehicle and having a concave curve in the front edge,
   and wherein
   said bulkhead extends for the length not exceeding the length of the upper half,
   and wherein
   said bulkhead does not extend forward beyond the nose portion of the upper half.

2. The air transport vehicle of claim 1, wherein the top surface of the upper half and the bottom surface of the upper half converge to a sharp horizontal edge at the nose portion of the upper half, but vertically diverge from each other toward the middle portion of the upper half, thus forming an upper inner cavity between the top surface of the upper half and the bottom surface of the upper half, and
   wherein the top surface of the lower half and the bottom surface of the lower half converge to a sharp horizontal edge at the nose portion of the lower half, but vertically diverge from each other toward the middle portion of the lower half, thus forming a lower inner cavity between the top surface of the lower half and the bottom surface of the lower half.

3. The air transport vehicle of claim 2, further comprising external slants, wherein the external slants are formed by the top surface of the upper half slanting toward the sharp horizontal edge in the nose end, and the bottom surface of the lower half slanting toward the sharp horizontal edge in the nose end.

4. The air transport vehicle of claim 3, further comprising internal slants, wherein the internal slants are formed by the bottom surface of the upper half slanting toward the sharp horizontal edge in the nose end, and the top surface of the lower half slanting toward the sharp horizontal edge in the nose end, wherein the internal slants have a gentler slope than the external slants for encountering less drag than external slants.

5. The air transport vehicle of claim 2, comprising at least one, curvature in the sharp horizontal edge, the curvature positioned in the nose end of the lower half.

6. The air transport vehicle of claim 1, wherein the at least one propulsion device is positioned inside the bore.

7. The air transport vehicle of claim 6, wherein the at least one propulsion device is a combination of turbofan engines and rocket engines.

8. The air transport vehicle of claim 7, further comprising a platform, said platform rotatably attached to the bulkhead, wherein one or more of the propulsion devices of the at least one propulsion device are attached to the platform.

9. The air transport vehicle of claim 1, comprising a landing gear, said landing gear comprising wheels, wherein at least some of the wheels are positioned in the tail portion of the lower half.

10. The air transport vehicle of claim 9, comprising a wheel spin-up mechanism, the wheel spin-up mechanism comprising a plurality of spoon-shaped blades attached to at least one of the wheels.

11. The air transport vehicle of claim 1, wherein the bulkhead comprises a vertical rudder, said vertical rudder vertically positioned at a height between the upper half and the lower half.

12. The air transport vehicle of claim 1, comprising a cockpit, said cockpit positioned above the top surface of the upper half, said cockpit being slidably detachable from the upper half.

13. The air transport vehicle of claim 1 comprising a plurality of raised bands on the bottom surface of the lower half, said bands extending longitudinally from the nose end of the vehicle to the tail end of the vehicle.

14. The air transport vehicle of claim 1, wherein the upper half horizontally extends further backward and further forward than the lower half.

15. The air transport vehicle of claim 1, wherein the at least one bulkhead comprises a useful hollow space inside.

16. The air transport vehicle of claim 1 wherein the tubular body comprises a plurality of bulkheads.

17. The air transport vehicle of claim 1, wherein the tubular body comprises at least one flexible net, said flexible net removably positioned to span the entire width and height of the bore.

18. The air transport vehicle of claim 1, wherein the upper half of the vehicle comprises a plurality of retractable horizontal wings and a plurality of wing compartments, said wing compartments intended for storage of the retractable horizontal wings, when the retractable horizontal wings are not in use.

19. A method of launching an air transport vehicle, comprising the steps of
   A. Providing the air transport vehicle comprising:
     i. a tubular body, said body comprising:
     the nose end of the vehicle,
     the tail end of the vehicle,
     an upper half and a lower half,
     wherein the upper half is positioned above the lower half, and wherein the upper half and the lower half are connected to each other, forming a bore between the upper half and the lower half, said bore extending longitudinally from the nose end of the vehicle to the tail end of the vehicle;
     wherein the upper half comprises:
     top surface of the upper half,
     bottom surface of the upper half,
     nose portion of the upper half,
     middle portion of the upper half,
     tail portion of the upper half;
     wherein the lower half comprises:
     top surface of the lower half,
     bottom surface of the lower half,
     nose portion of the lower half,
     middle portion of the lower half,
     tail portion of the lower half;
     at least one bulkhead connected to the upper half and the lower half and extending longitudinally inside the bore and shaped in the form of a sharp vertical edge in the nose end of the vehicle and having a concave curve in the front edge;
     ii. at least one propulsion device;
   B. Providing a launching carriage comprising wheels and at least one acceleration device, said launching carriage placed on rails; wherein the rails are sloped at an upward angle;
   C. Mounting the air transport vehicle onto the launching carriage;
   D. Accelerating the launching carriage to at least the minimum takeoff speed of the air transport vehicle.

* * * * *